United States Patent
Howe

(10) Patent No.: US 11,143,234 B2
(45) Date of Patent: Oct. 12, 2021

(54) FLUID DAMPING SYSTEM FOR TRACTION DRIVE

(71) Applicant: SuperTurbo Technologies, Inc., Loveland, CO (US)

(72) Inventor: Jared Howe, Loveland, CO (US)

(73) Assignee: SUPERTURBO TECHNOLOGIES, INC., Loveland, CO (US)

( * ) Notice: Subject to any disclaimer, the term of this patent is extended or adjusted under 35 U.S.C. 154(b) by 131 days.

(21) Appl. No.: 16/788,099

(22) Filed: Feb. 11, 2020

(65) Prior Publication Data

US 2020/0277987 A1    Sep. 3, 2020

Related U.S. Application Data

(60) Provisional application No. 62/813,006, filed on Mar. 2, 2019.

(51) Int. Cl.

| | |
|---|---|
| *F16C 19/28* | (2006.01) |
| *F16H 13/08* | (2006.01) |
| *F16F 15/023* | (2006.01) |
| *F02C 3/04* | (2006.01) |
| *F02M 26/02* | (2016.01) |
| *F02C 7/36* | (2006.01) |

(52) U.S. Cl.
CPC ............... *F16C 19/28* (2013.01); *F02C 3/04* (2013.01); *F02C 7/36* (2013.01); *F02M 26/02* (2016.02); *F16F 15/0237* (2013.01); *F16H 13/08* (2013.01); *F16C 2360/24* (2013.01); *F16F 2222/12* (2013.01)

(58) Field of Classification Search
CPC .... F16C 19/28; F16C 2360/24; F16C 33/768; F16C 35/063; F16C 27/045; F16C 2361/65; F16C 19/54; F16H 13/08; F16H 13/06; F16H 57/0006; F16H 57/023; F16H 57/028; F16H 57/08; F16H 2057/02039; F16F 15/0237; F16F 2222/12; F02C 3/04; F02C 7/36; F02C 6/12; F02M 26/02; Y02T 10/12; F02B 39/04; F02B 37/105; F02B 37/00
See application file for complete search history.

(56) References Cited

U.S. PATENT DOCUMENTS

| | | | |
|---|---|---|---|
| 4,719,818 A | * | 1/1988 | McCreary ............. F02B 37/105 475/159 |
| 8,561,403 B2 | | 10/2013 | VanDyne et al. |

(Continued)

OTHER PUBLICATIONS

Robert E. Cunningham, Edgar J. Gunter, Jr. and David P. Fleming; Design of an Oil Squeeze Film Damper Bearing for a Multimass Flexible-Rotor Bearing System: NASA Technical Note.

*Primary Examiner* — Jacob M Amick
*Assistant Examiner* — Charles J Brauch
(74) *Attorney, Agent, or Firm* — Cochran Freund & Young LLC; William W. Cochran

(57) ABSTRACT

Disclosed is a fluid damping system for a planetary traction drive designed for a driven turbocharger on an engine. The planetary traction drive has a plurality of double roller planets that are each supported by two planet bearings, one at each end of the double roller planet. Each planet bearing has a fluid damping system that consists of a radial squeeze film damper that feeds fluid to an axial squeeze film damper to absorb vibrations and dissipate kinetic energy in the planetary traction drive.

19 Claims, 5 Drawing Sheets

(56) References Cited

U.S. PATENT DOCUMENTS

| | | |
|---|---|---|
| 8,608,609 B2 | 12/2013 | Sherrill et al. |
| 8,668,614 B2 | 3/2014 | Sherrill et al. |
| 9,670,832 B2 | 6/2017 | Sherrill et al. |
| 10,107,183 B2 | 10/2018 | Sherrill et al. |

* cited by examiner

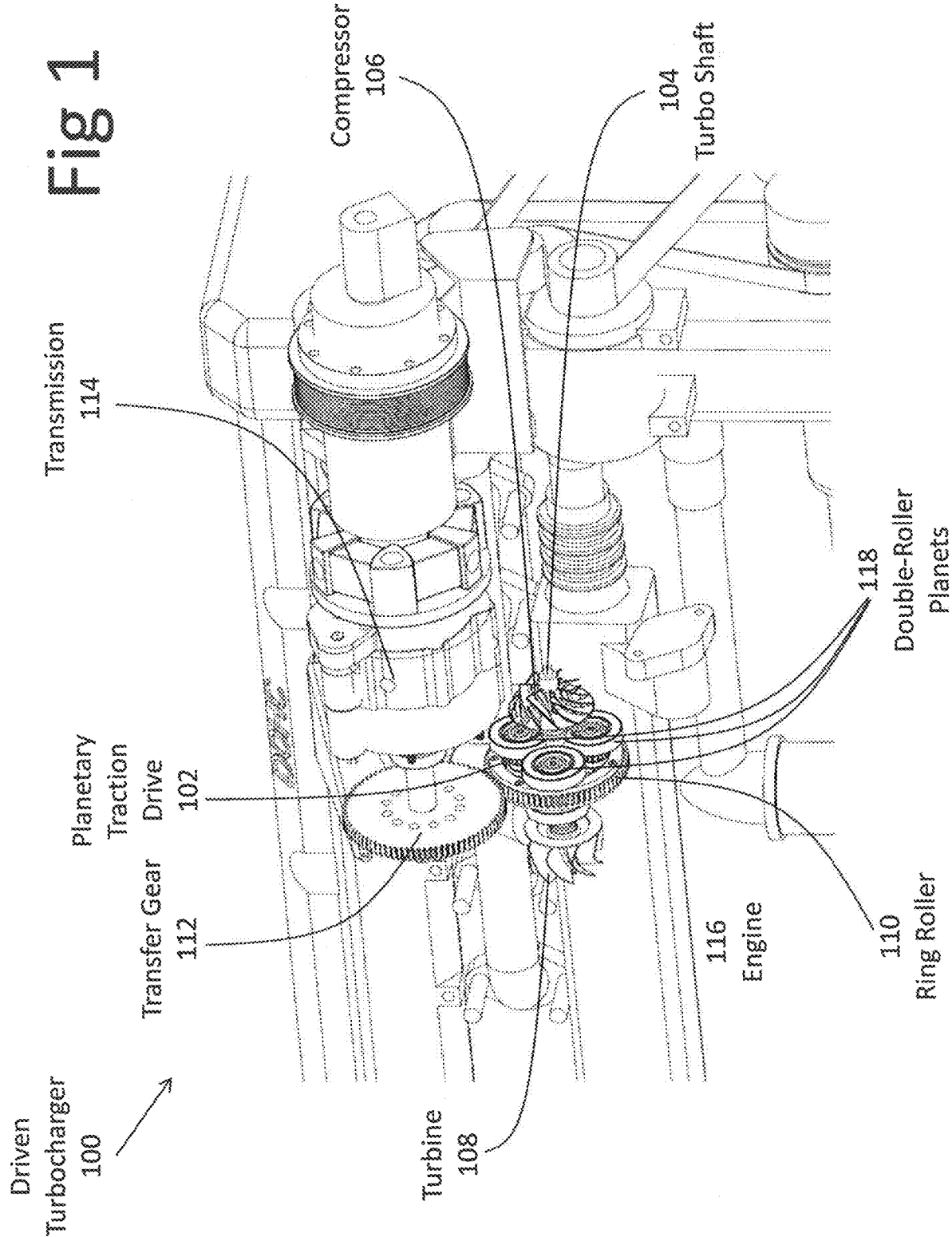

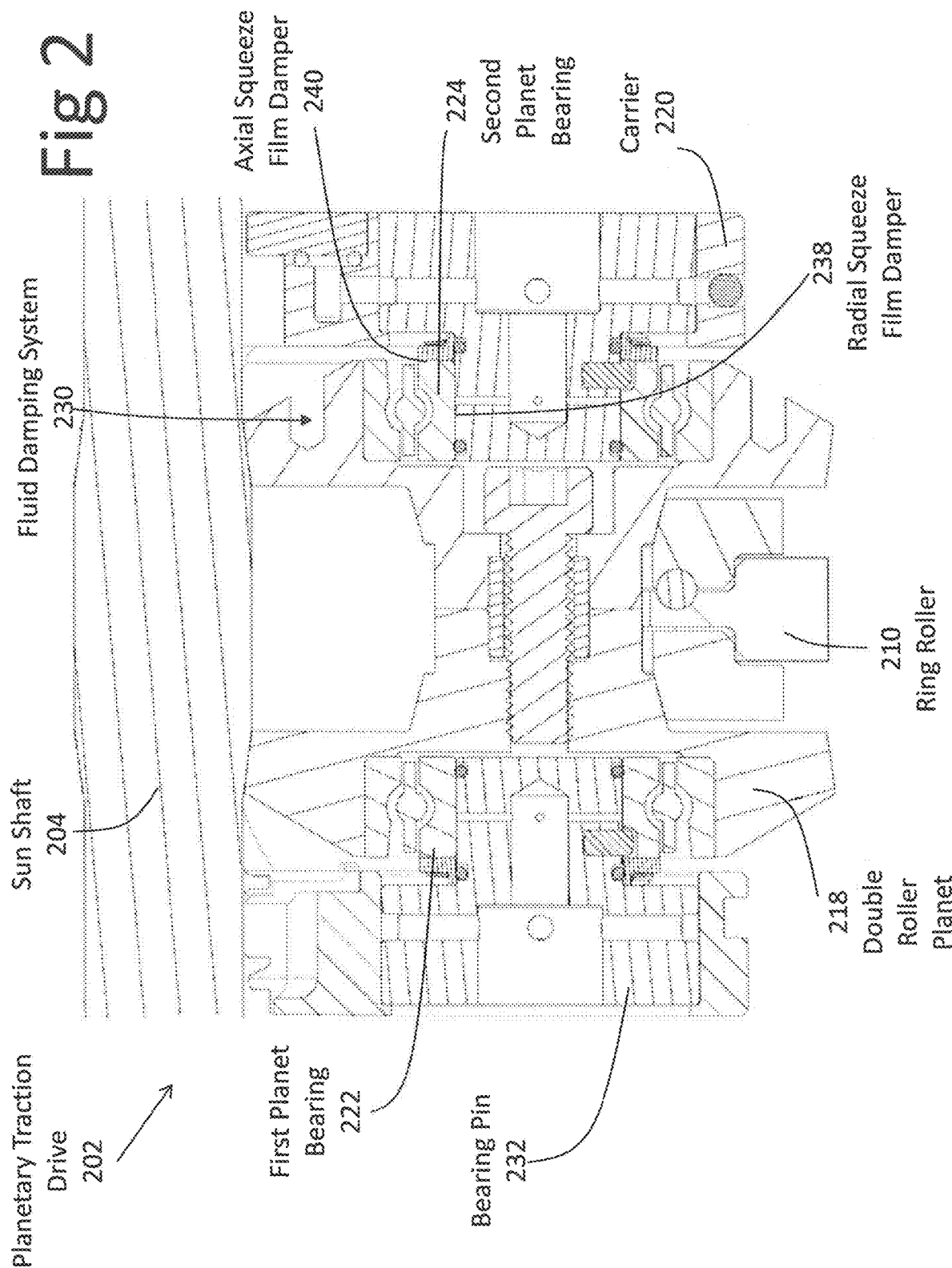

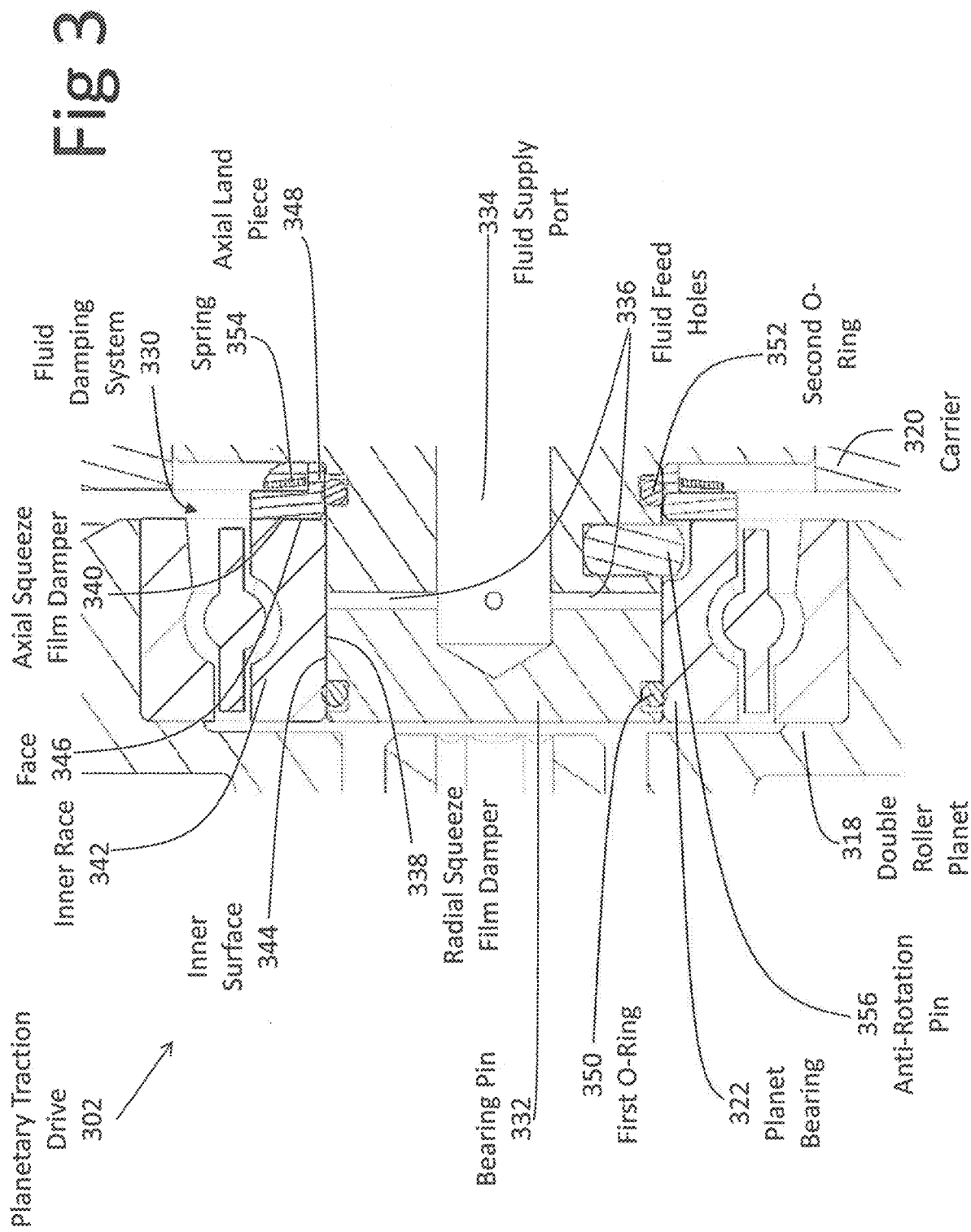

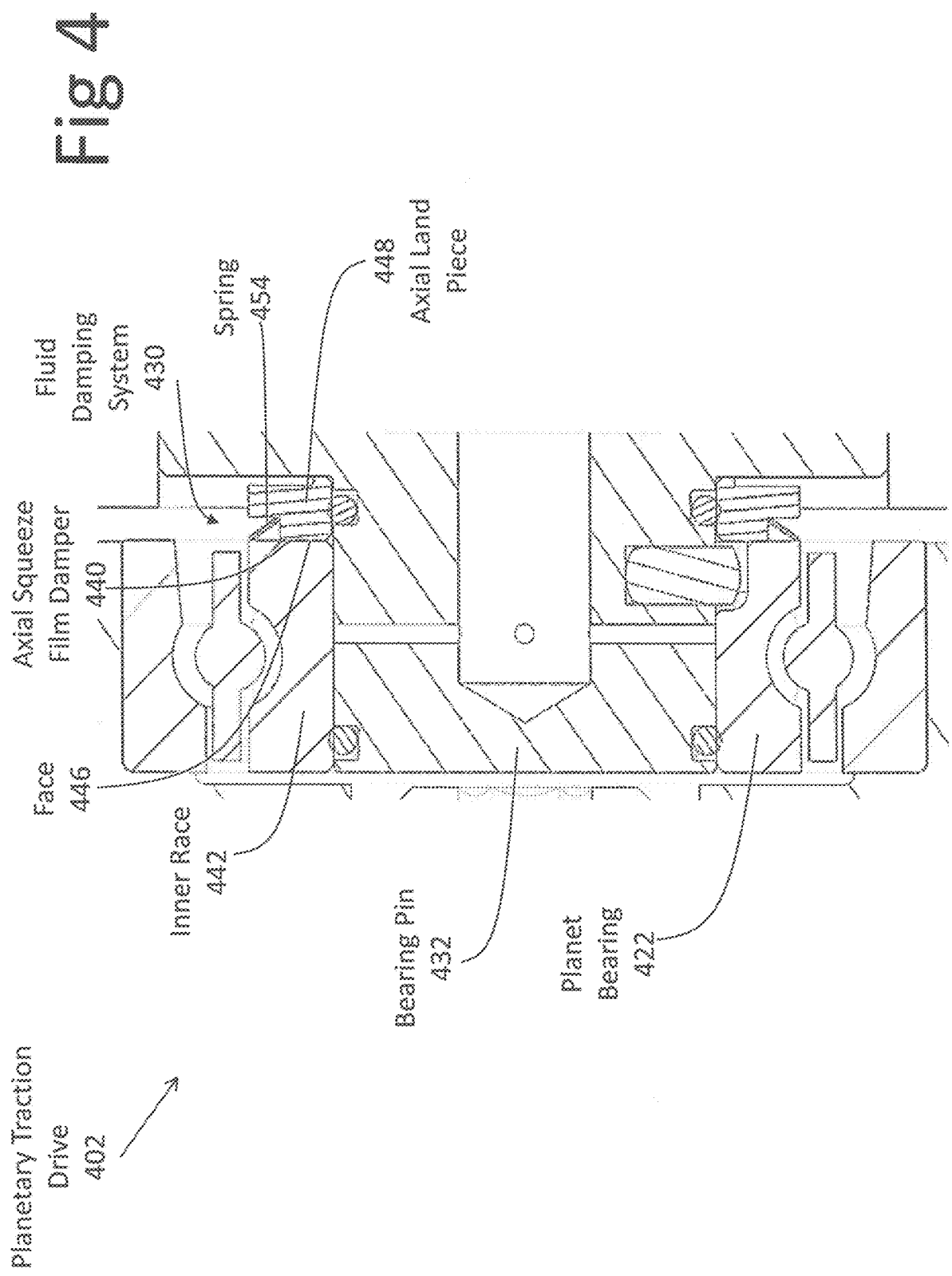

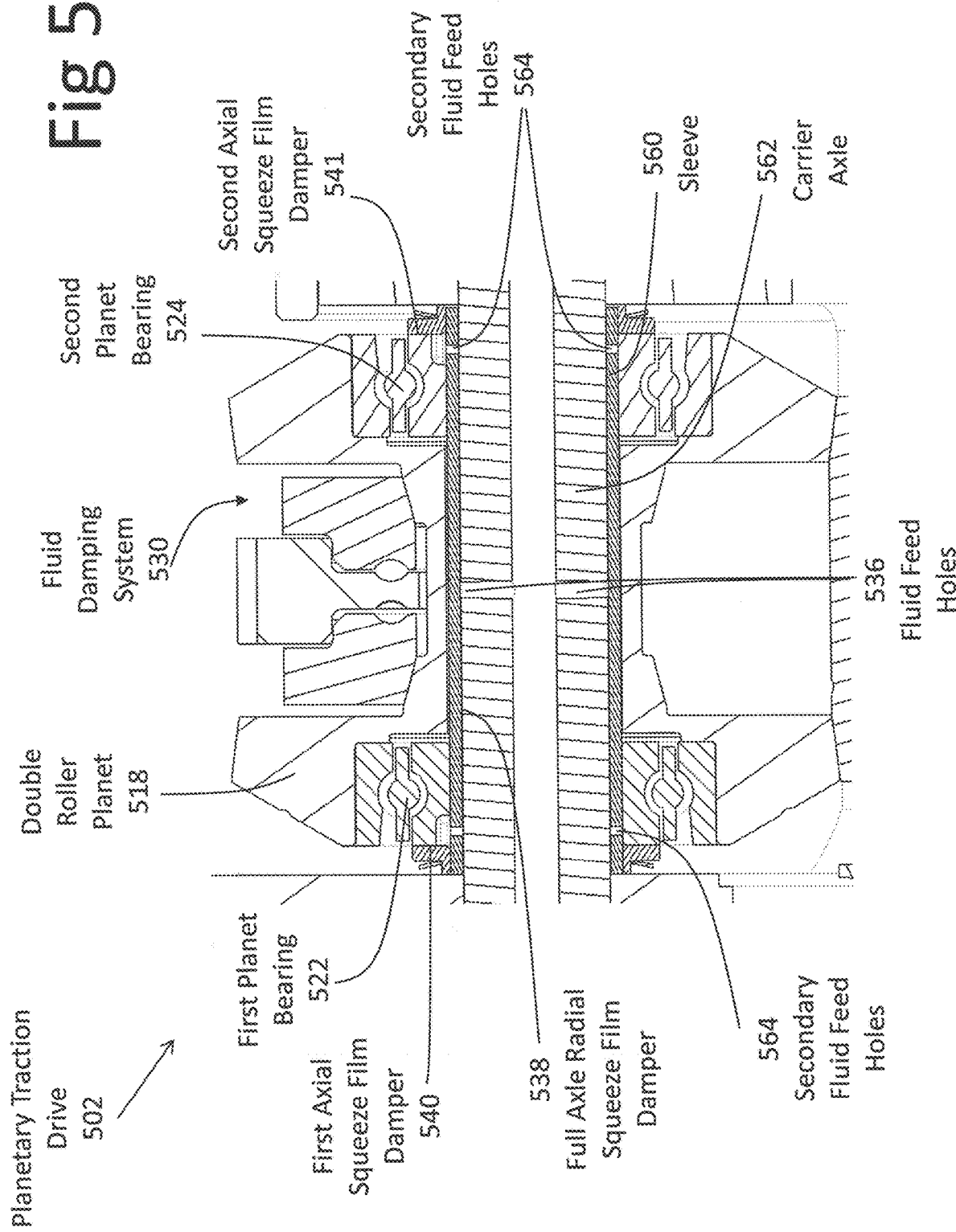

FLUID DAMPING SYSTEM FOR TRACTION DRIVE

BACKGROUND

Driven turbochargers are an improvement over normal turbochargers since driven turbochargers (super-turbochargers) are powered by more than just the exhaust gas turbine, which reduces turbo-lag in boosted engines. Driven turbochargers can also direct excess turbine power back to the engine to increase engine efficiency. One class of driven turbocharger utilizes a planetary traction drive that interfaces with the turbo shaft to provide torque to and from the turbo shaft.

SUMMARY

An embodiment of the present invention may therefore comprise a planetary traction drive comprising: a sun shaft; a plurality of double-roller planets that interface with the sun shaft, each of the double-roller planets mounted in a carrier on a first planet bearing and a second planet bearing at opposite ends of the double roller planets, where both the first planet bearing and the second planet bearing have a fluid damping system comprising: a bearing pin with a fluid supply port; at least one fluid feed hole that supplies fluid to a radial squeeze film damper between said bearing pin and an inner surface of an inner race of the planet bearing; an axial squeeze film damper that receives fluid from the radial squeeze film damper and is located between a face of the inner race of the planet bearing and an axial land piece of the carrier, wherein the radial squeeze film damper and the axial squeeze film damper absorb vibrations from the planetary traction drive; a ring roller that interfaces with the plurality of double-roller planets.

An embodiment of the present invention may therefore further comprise a method of providing radial and axial damping of a planetary traction drive comprising: providing a sun shaft; interfacing a plurality of double-roller planets to the sun shaft; supporting each of the plurality of double-roller planets with a first planet bearing and a second planet bearing coupled to a carrier, where the first planet bearing and the second planet bearing have a fluid damping system that; supply fluid to a radial squeeze film damper through at least one feed hole; supply fluid from the radial squeeze film damper to an axial squeeze film damper; dissipate kinetic energy from the planetary traction drive through the radial squeeze film damper and the axial squeeze film damper; interfacing a ring roller to the plurality of double-roller planets.

An embodiment of the present invention may therefore further comprise a planetary traction drive comprising: a sun shaft; a plurality of double roller planets that interface with the sun shaft, each of the double roller planets mounted in a carrier on a first planet bearing and a second planet hearing at opposite ends of the double roller planets, wherein the first planet bearing the second planet bearing have a fluid damping system comprising: a full axle radial squeeze film damper located between a carrier axle and a sleeve, wherein the carrier axle has fluid feed holes that supply fluid to the full axle radial squeeze film damper and the first planet bearing and the second planet bearing are mounted on opposite ends of the sleeve; a first axial squeeze film damper and a second axial squeeze film damper that receive fluid flow from the full axle radial squeeze film damper through secondary fluid feed holes wherein the full axle radial squeeze film damper and the first axial squeeze film damper and the second axial squeeze film damper absorb vibrations from said planetary traction drive; a ring roller that interfaces with the plurality of double roller planets.

BRIEF DESCRIPTION OF THE DRAWINGS

FIG. 1 is an isometric view of a driven turbocharger with a planetary traction drive.

FIG. 2 is a cross section of a double roller planet of a planetary traction drive.

FIG. 3 is a zoomed in cross section of a fluid damping system for a planet bearing of a planetary traction drive.

FIG. 4 is a zoomed in cross section of an alternate embodiment of a spring for preload on a planet bearing of a planetary traction drive.

FIG. 5 is a cross-sectional view of alternate embodiment of a full axle radial squeeze film damper for a planet bearing of a planetary traction drive.

DETAILED DESCRIPTION OF THE EMBODIMENTS

FIG. 1 is an isometric view of a driven turbocharger 100 with a planetary traction drive 102. The operation of driven turbocharger 100 is as taught in U.S. Pat. No. 8,561,403, issued Oct. 22, 2013, entitled "Super-Turbocharger Having a High Speed Traction Drive and a Continuously Variable Transmission," U.S. Pat. No. 8,668,614, issued Mar. 11, 2014, entitled "High Torque Traction Drive," U.S. Pat. No. 8,608,609, issued Dec. 17, 2013, entitled "Symmetrical Traction Drive," U.S. Pat. No. 9,670,832, issued Jun. 6, 2017, entitled "Thrust Absorbing Planetary Traction Drive SuperTurbo," and U.S. Pat. No. 10,107,183, issued Oct. 23, 2018, entitled "Eccentric Planetary Traction Drive Super-Turbocharger." U.S. Pat. Nos. 8,561,403, 8,668,614, 8,608,609, 9,670,832 and 10,107,183 are specifically incorporated herein by reference for all that they disclose and teach. Driven turbocharger 100 comprises a turbo shaft 104 with a compressor 106 attached to one end and a turbine 108 attached to the other end. Planetary traction drive 102 interfaces with turbo shaft 104 and transmits torque to and from turbo shaft 104. Double-roller planets 118 interface with turbo shaft 104. Ring roller 110 interfaces with double-roller planets 118 and is an output of planetary traction drive 102 that interfaces with transfer gear 112, which in turn is coupled to transmission 114. Transmission 114 transfers power between engine 116 and planetary traction drive 102. In this way, transmission 114 is coupled to ring roller 110, to provide power throughput between engine 116 and compressor 106 and turbine 108 on turbo shaft 104.

FIG. 2 is a cross section of a double roller planet 218 of a planetary traction drive 202, Double roller planet 218 interfaces with sun shaft 204, which corresponds to turbo shaft 104 from FIG. 1. Double roller planet 218 also interfaces with ring roller 210. Double roller planet 218 is mounted in a carrier 220 on a first planet bearing 222 and a second planet bearing 224 at opposite ends of double roller planet 218. Both first planet bearing 222 and second planet bearing 224 have a fluid damping system 230, and are mounted on a bearing pin 232 of carrier 220. Bearing pin 232 is a part of carrier 220, and provides a mounting spot for a planet bearing such as first planet bearing 222 and second planet bearing 224. The fluid damping system 230 of first planet bearing 222 and second planet bearing 224 consists of a radial squeeze film damper 238 and an axial squeeze film damper 240 that absorb vibrations and dissipate kinetic energy from planetary traction drive 202. First planet bearing 222 and second planet bearing 224 are shown as angular contact ball bearings, but other types of bearings may be used as well.

FIG. 3 is a zoomed in cross section of a fluid damping system 330 for a planet bearing 322 of a planetary traction drive 302. Planet bearing 322 corresponds to both first planet bearing 222 and second planet bearing 224 of FIG. 2, supporting double roller planet 318. Carrier 320 has a bearing pin 332 with a fluid supply port 334, and one or more fluid feed holes 336 that supply fluid to radial squeeze film damper 338 that is located between bearing pin 33 and an inner surface 344 of an inner race 342 of planet bearing 322. Axial squeeze film damper 340 receives fluid from radial squeeze film damper 338 and is located between a face 346 of inner race 342 of planet bearing 322 and an axial land piece 348 of carrier 320. Axial land piece 348 may be integrated into carrier 320, or may be a separate part, as is shown in FIG. 3. Traction fluid is commonly used in traction drives, such as planetary traction drive 302, so this traction fluid can be applied to fluid supply port 334 for radial squeeze film damper 338 and axial squeeze film damper 340. Also shown is a first O-ring 350 between hearing pin 332 and inner race 342 of planet bearing 322, and a second O-ring 352 between bearing pin 332 and axial land piece 348 that seal fluid in radial squeeze film damper 338 and axial squeeze film damper 340. First O-ring 350 and second O-ring 352 ensure the fluid necessary for both radial squeeze film damper 338 and axial squeeze film damper 340 follows the necessary path from fluid feed holes 336 into radial squeeze film damper 338 and then into axial squeeze film damper 340 and does not escape through alternate paths. Spring 354 is located between bearing pin 332 and axial land piece 348 and provides preload on planet bearing 322. Spring 354 pushes axial land piece 348 away from bearing pin 332, which in turn pushes on inner race 342 of planet bearing 322, setting a desired preload on planet bearing 322. In this configuration, spring 354 and axial squeeze film damper 340 are arranged in series. Anti-rotation pin 356 mates with planet bearing 322 and bearing pin 332 to prevent rotation of planet hearing 322 relative to hearing pin 332. Anti-rotation pin 356 locks into both inner race 342 of planet bearing 322 and into bearing pin 332, preventing scuffing of inner race 342 of planet bearing 322 on bearing pin 332.

FIG. 4 is a zoomed in cross section of an alternate embodiment of a spring 454 for preload on a planet bearing 422 of a planetary traction drive 402. The function of fluid damping system 430 is the same as described in FIG. 3. The placement of spring 454 for preload on planet bearing 422 is different, as spring 454 is located between axial land piece 448 and face 446 of inner race 442 of planet bearing 422. This way, spring 454 pushes directly on inner race 442 of planet bearing 422, instead of through axial land piece 448, to provide preload on planet bearing 422. In this configuration, spring 454 is arranged in parallel with axial squeeze film damper 440. Spring 454 may also be located between bearing pin 432 and planet bearing 422 with the same effect, as in this configuration axial land piece 448 is stationary relative to bearing pin 432.

FIG. 5 is a cross-sectional view of alternate embodiment of a full axle radial squeeze film damper 538 for a double roller planet 518 of a planetary traction drive 502. Full axle radial squeeze film damper 538 extends the entire axial distance between first planet bearing 522 and second planet bearing 524, providing increased surface area for full axle radial squeeze film damper 538. First planet bearing 522 and second planet bearing 524 are mounted on opposite ends of sleeve 560, which is located around carrier axle 562. Carrier axle 562 has fluid feed holes 536 that supply fluid to full axle radial squeeze film damper 538, which is located between carrier axle 562 and sleeve 560. Secondary fluid feed holes 564 are located in sleeve 560, which allow fluid to flow from full axle radial squeeze film damper 538 to first axial squeeze film damper 540 and second axial squeeze film damper 541. Together, full axle radial squeeze film damper 538, first axial squeeze film damper 540 and second axial squeeze film damper 541 comprise fluid damping system 530, which works to reduce vibrations in planetary traction drive 502.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A planetary traction drive comprising:
a sun shaft;
a plurality of double-roller planets that interface with said sun shaft, each of said double-roller planets mounted in a carrier on a first planet bearing and a second planet bearing at opposite ends of said double-roller planets, where both said first planet bearing and said second planet bearing have a fluid damping system comprising:
a bearing pin with a fluid supply port;
at least one fluid feed hole that supplies fluid to a radial squeeze film damper between said bearing pin and an inner surface of an inner race of said planet bearing;
an axial squeeze film damper that receives fluid from said radial squeeze film damper and is located between a face of said inner race of said planet bearing and an axial land piece of said carrier,
wherein said radial squeeze film damper and said axial squeeze film damper absorb vibrations from said planetary traction drive;
a ring roller that interfaces with said plurality of double-roller planets.

2. The planetary traction drive of claim 1 further comprising:
a turbine and a compressor attached to said sun shaft and a transmission coupled to said ring roller to form a driven turbocharger.

3. The planetary traction drive of claim 1 where traction fluid is applied to said fluid supply port.

4. The planetary traction drive of claim 1 further comprising:
a first O-ring between said bearing pin and said inner race of said planet hearing and a second O-ring between said hearing pin and said axial land piece that seal fluid in said radial squeeze film damper and said axial squeeze film damper.

5. The planetary traction drive of claim 1 further comprising:

an anti-rotation pin that mates with said inner race of said planet bearing and said bearing pin to prevent rotation of said inner race of said planet bearing relative to said bearing pin.

6. The planetary traction drive of claim 1 further comprising:
a spring located between said bearing pin and said axial land piece that provides preload on said planet bearing.

7. The planetary traction drive of claim 1 further comprising:
a spring arranged in parallel with said axial squeeze film damper that pushes directly on said inner race of said planet bearing to provide preload on said planet bearing.

8. A method of providing radial and axial damping of a planetary traction drive comprising:
providing a sun shaft;
interfacing a plurality of double-roller planets to said sun shaft;
supporting each of said plurality of double-roller planets with a first planet bearing and a second planet bearing coupled to a carrier, where said first planet bearing and said second planet bearing have a fluid damping system that:
supply fluid to a radial squeeze film damper through at least one feed hole;
supply fluid from said radial squeeze film damper to an axial squeeze film damper;
dissipate kinetic energy from said planetary traction drive through said radial squeeze film damper and said axial squeeze film damper;
interfacing a ring roller to said plurality of double-roller planets.

9. The method of claim 8 further comprising:
connecting a turbine and a compressor to said sun shaft and coupling a transmission to said ring roller to form a driven turbocharger.

10. The method of claim 8 where traction fluid is applied to said at least one fluid feed hole.

11. The method of claim 8 wherein said fluid damping system further comprises:
supplying fluid through a fluid supply port in a bearing pin, where said radial squeeze film damper is located between said bearing pin and an inner surface of an inner race of said planet bearing, and said axial squeeze film damper is located between a face of said inner race of said planet bearing and an axial land piece of said carrier.

12. The method of claim 11 further comprising:
placing a first O-ring between said bearing pin and said inner race of said planet bearing and placing a second O-ring between said bearing pin and said axial land piece in order to seal fluid in said radial squeeze film damper and said axial squeeze film damper.

13. The method of claim 11 further comprising:
mating an anti-rotation pin with said inner race of said planet bearing and said bearing pin to prevent rotation of said inner race of said planet bearing relative to said bearing pin.

14. The method of claim 11 further comprising:
locating a spring between said bearing pin and said axial land piece to provide preload on said planet bearing.

15. The method of claim 11 further comprising:
arranging a spring in parallel with said axial squeeze film damper that pushes directly on said inner race of said planet bearing to provide preload on said planet bearing.

16. The method of claim 8 further comprising:
mounting said first planet bearing and said second planet bearing on opposite ends of a sleeve that is located around a carrier axle, said carrier axle having said fluid feed holes that supply fluid to a full axle radial squeeze film damper that are located between said carrier axle and said sleeve.

17. A planetary traction drive comprising:
a sun shaft;
a plurality of double roller planets that interface with said sun shaft, each of said double roller planets mounted in a carrier on a first planet bearing and a second planet bearing at opposite ends of said double roller planets, wherein said first planet bearing and said second planet bearing have a fluid damping system comprising:
a full axle radial squeeze film damper located between a carrier axle and a sleeve, wherein said carrier axle has fluid feed holes that supply fluid to said full axle radial squeeze film damper and said first planet bearing and said second planet bearing are mounted on opposite ends of said sleeve;
a first axial squeeze film damper and a second axial squeeze film damper that receive fluid flow from said full axle radial squeeze film damper through secondary fluid feed holes wherein said full axle radial squeeze film damper and said first axial squeeze film damper and said second axial squeeze film damper absorb vibrations from said planetary traction drive;
a ring roller that interfaces with said plurality of double roller planets.

18. The planetary traction drive of claim 17 further comprising:
a turbine and a compressor attached to said sun shaft and a transmission coupled to said ring roller to form a driven turbocharger.

19. The planetary traction drive of claim 17 wherein traction fluid is applied to said fluid feed holes.

* * * * *